Figure 1:
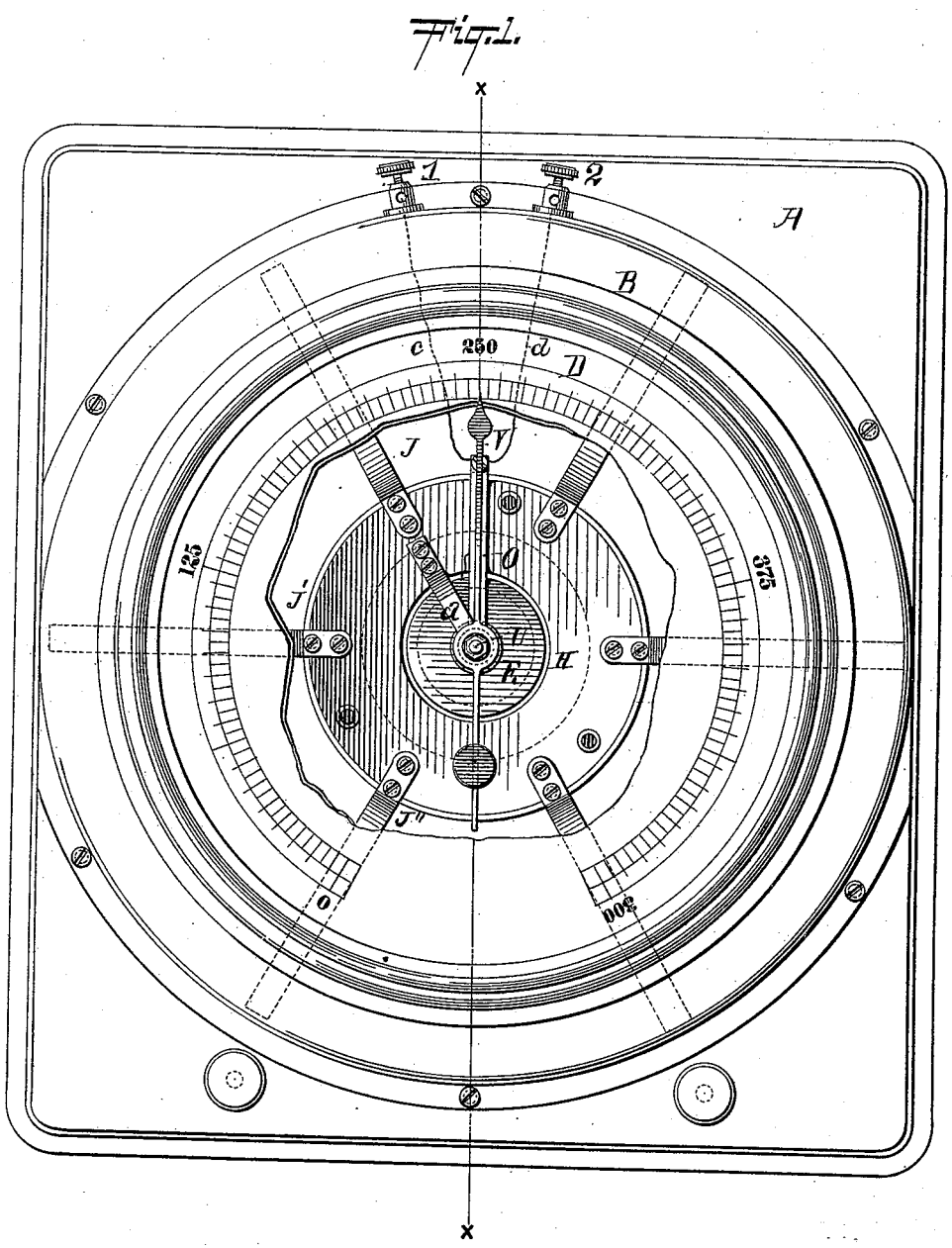

(No Model.)  2 Sheets—Sheet 1.

E. WESTON.
ELECTRICAL INDICATING INSTRUMENT.

No. 465,442. Patented Dec. 15, 1891.

WITNESSES:
Gustave Dieterich
M. Rosch

INVENTOR
Edward Weston
BY
Parsel Benjamin
his ATTORNEY.

(No Model.) 2 Sheets—Sheet 2.
E. WESTON.
ELECTRICAL INDICATING INSTRUMENT.
No. 465,442. Patented Dec. 15, 1891.
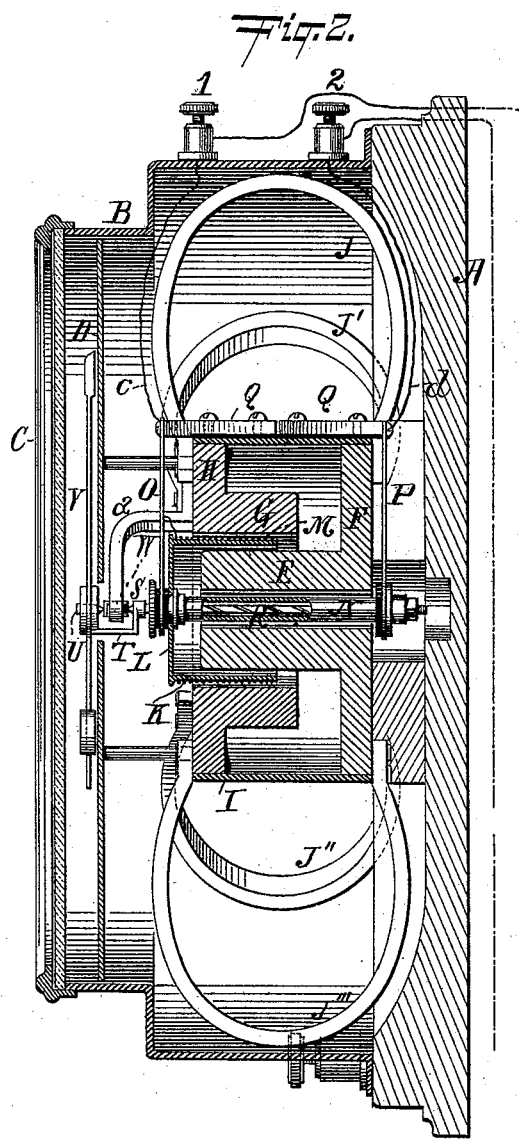
WITNESSES:
Gustave Dieterich
M. Bosch
INVENTOR
Edward Weston
BY Park Benjamin
his ATTORNEY.

UNITED STATES PATENT OFFICE.

EDWARD WESTON, OF NEWARK, NEW JERSEY.

ELECTRICAL INDICATING-INSTRUMENT.

SPECIFICATION forming part of Letters Patent No. 465,442, dated December 15, 1891.

Application filed March 11, 1891. Serial No. 384,649. (No model.)

*To all whom it may concern:*

Be it known that I, EDWARD WESTON, of Newark, Essex county, New Jersey, have invented a new and useful Improvement in Electrical Indicating-Instruments, of which the following is a specification.

In Letters Patent No. 446,493, dated February 17, 1891, I have described an electrical measuring-instrument designed more particularly for measurement of the strength of powerful currents ranging into thousands of ampères; and to that end its construction embodies an electro-magnet the coil of which is made of copper strips and so constructed that the cross-sectional conducting area is very large. In the annular space between the pole-pieces there is a suspended coil, which is also traversed by the current which passes through the main coil of the instrument. The movement of the suspended coil therefore depends upon the resultant action of the two fields, one due to the passage of the current through the main coil and the other to the passage of the current through the much smaller suspended coil.

In my present device the fixed coil is eliminated and the movable coil is disposed in the annular field produced between the poles of a permanent magnet. This field is consequently uniform in strength and does not in any wise depend upon current variations. On the other hand, the movement of the coil depends wholly on such fluctuations, whether the same be due to differences in resistance in the circuit or changes in electro-motive force. It follows, therefore, that no matter how great the normal resistance is in the circuit the instrument will operate regardless thereof, and equally exceedingly small changes in resistance will determine movements of the coil. The construction of the magnet is such as to make the permanent field exceedingly strong, so that the slightest variation in the field produced by the current around the coil will result in a change of position of the latter, or, in other words, the coil will move to a new position dependent upon the condition of the current as compared with normal condition, and there remain until another change in electro-motive force or resistance takes place. The transmitting mechanism between coil and index is arranged so as to produce a very large movement of the index, corresponding to a small movement of the coil. The result is that I have here an instrument in which the needle will not only indicate on a suitable scale the electro-motive force or strength of a current to be measured, but which with a current of determinate electro-motive force or strength will always go to a certain definite position on said scale and stay there as long as no change in the current occurs. As a consequence the uses to which the present apparatus can be put are exceedingly important and numerous. It is an efficient measuring-instrument for the determination of current strength or pressure, inasmuch as the position of the coil, and hence of the needle, always bears a relation to the difference of potential existing between its terminals. It is especially suited for use in telegraphy, inasmuch as it substitutes an index moving continuously and regularly to any part of a scale or around over an entire scale for the intermittent and irregular step-by-step motion now in common employment. It thus may be used in dial telegraphs, gold and stock telegraphs, and all apparatus of that general description. It is also excellently adapted to use as an annunciator for hotels for indicating room-numbers or for telegraphing from rooms to office the special wants of the occupants, the scale being marked as is usual in "telesemes" or instruments of like character. Practical experiment has shown it to be of great accuracy as the indicator in an electrical range-finder for indicating the range in yards corresponding to a disturbance of balance in a Wheatstone bridge-circuit, for example. It is of especial advantage as an electrical indicator in all cases where such instruments are employed—as, for example, in telethermometers, telebarometers, electric thermostats, incubators, telehydrometers, and electric alarms of all sorts.

Inasmuch as normal resistance is practically without effect, two or more such instruments will give exactly similar indications, however great the length of the intervening conductor within practicable limits. So, also, inasmuch as the instrument responds to exceedingly slight changes in the current, it may be used for telegraphic purposes over very long distances without the intervention of relays or repeaters.

In brief the apparatus serves every purpose for which there is needed an indicating device controllable by electricity to give at every instant and continuously a precise indication, no matter what the scale-units or the general character of that indication may be. To apply it to such purposes, whether set forth here or not, requires no modification in the essential construction of the apparatus and is easily within the present knowledge of any electrical workman.

In the accompanying drawings, Figure 1 is a plan view of my instrument, showing a portion of the scale broken away to exhibit the internal parts. Fig. 2 is a section on the line X X of Fig. 1.

Similar letters and figures of reference indicate like parts.

A is the base of the instrument.

B is the cover, the front side of which is closed by a glass plate C, which enables the scale-plate D to be seen.

E is a tubular pole-piece of iron or other magnetic material having a flange F, by which it is secured to the base-board A.

G is another tubular pole-piece of iron or other magnetic material flanged at H and connected to the flange of pole-piece E by a ring I of brass. The pole-piece E is smaller in diameter and is received within the pole-piece G, as shown.

J J' J", &c., are permanent magnet-bars having their ends approximated and connected, respectively, to flange H of pole-piece G and flange F of pole-piece E. The pole-pieces E and G are therefor common to the compound magnet, which includes the six magnets J J', &c., and between said poles there is necessarily a very intense magnetic field.

K is a cylinder of aluminium or other light metal, closed at one end by a diaphragm L and carrying a coil M of fine insulated wire. The cylinder K is supported on a tube N, which tube extends through the pole-piece E and is carried by two springs O and P. The springs O and P are supported on the brass ring I, but are insulated therefrom by strips of rubber or other insulating material. Fastened to one end of the tube N and extending through the same is a spiral spring R. The other end of said spring is fastened to a pin S, which is received on one arm of the yoke T. Through the other arm of yoke T passes the pin U, which secures to said arm the index-needle V. The pins S and U are received in a pivot-block W between the arms of the yoke T, and this pivot-block is sustained by a bracket a, supported on the pole-piece G.

The arrangement of the cylinder L, with its coil K, the tube N, with its supporting-springs O P, the spring, pins S and U, yoke T, needle V, block W, bracket a, and scale-plate D, over which the needle V moves, is the same as is fully represented and described in my aforesaid patent.

The operation of the instrument is as follows: Circuit proceeds from binding-post 1 by wire c to spring O, to coil M, to cylinder K, to tube N, to spring P, and so by wire d to binding-post 2, or vice versa. The effect of the current is to cause coil M to be drawn into the annular space between the pole-pieces to an extent bearing a relation to the extent of difference in potential between the terminals of the instrument. The motion of the coil is communicated to the spiral spring R, and this spring in turn causes the rotation of the yoke T, and consequently a proportional movement of the needle V over the scale.

I claim—

1. The combination, in an electrical indicating-instrument, of a coil supported so as to be axially movable, a means of producing a permanent field of force around said coil, and a means independent of the coil-support for indicating the extent of movement of said coil.

2. The combination, in an electrical indicating-instrument, of a permanent magnet, a coil supported so as to be axially movable in the field thereof, and a means independent of the coil-support for indicating the extent of movement of said coil.

3. The combination, in an electrical indicating-instrument, of a permanent magnet having concentric poles, a coil supported so as to be axially movable in the field between said poles, and means independent of the coil-support for indicating the extent of movement of said coil.

4. The combination, in an electrical indicating-instrument, of a permanent magnet having concentric annular poles, and a coil supported so as to be axially movable in the field between said poles.

5. In an electrical indicating-instrument, a permanent magnet having flanged tubular pole-pieces, one disposed within the other, and a body portion having its polar extremities connected to the flanges of said pole-pieces.

6. In an electrical indicating-instrument, the tubular pole-piece E, having flange F, the tubular pole-piece G, having the flange H, said pole-piece G receiving said pole-piece E, and the bent magnet-bar J, connected at its ends to the flanges F and H.

7. In an electrical indicating-instrument, a permanent magnet having concentric annular poles, a movable support extending axially through said magnet, and a coil carried by said support and disposed in the annular space between said poles.

8. In an electrical indicating-instrument, a compound permanent magnet embodying two or more magnet-bars and flanged tubular pole-pieces, each bar having its extremities approximated and connected to the flanges of the said tubular pole-pieces, one of said pole-pieces being received within the other.

9. In an electrical indicating-instrument, a compound permanent magnet embodying two or more magnet-bars and flanged tubular pole-pieces, each bar having its extremities approximated and connected to the flanges of the said tubular pole-pieces, (one pole-piece being received within the other,) in combination with a coil supported and movable in the annular field between said pole-pieces.

10. In an electrical indicating-instrument, a compound magnet embodying two or more magnet-bars and flanged tubular pole-pieces, each bar having its extremities approximated and connected to the flanges of the said tubular pole-pieces, (one of said pole-pieces being received within the other,) in combination with a coil supported and movable in the annular space between said pole-pieces, a scale, an index movable over said scale, and a means for converting the bodily motion of said coil into vibratory motion of said index.

11. In an electrical indicating-instrument, the tubular pole-piece E, having flange F, the tubular pole-piece G, having flange H, (said pole-piece G receiving said pole-piece E,) the inclosing peripherical ring or band I, of non-magnetic material, connected to said pole-pieces, and two or more magnet-bars having their extremities connected to the flanges of said pole-pieces.

12. In an electrical indicating-instrument, the tubular pole-piece E, having flange F, the tubular pole-piece G, having flange H, (the said pole-piece G receiving said pole-piece E,) two or more magnet-bars J, having their polar extremities secured to said flanges, the cylinder L, carrying the coil M and movable in the annular field between said pole-pieces, the springs O P, supporting said cylinder, the scale D, index-needle V, and mechanism for converting the bodily motion of said coil into vibratory motion of said index.

EDWARD WESTON.

Witnesses:
R. C. FESSENDEN,
A. F. CONERZ, Jr.